3,104,200
N-(α-METHYLACETONITRILE)-MORPHOLINE AS INSECT FUMIGANT FOR STORED PRODUCTS
William K. Langdon, Grosse Ile, and William W. Levis, Jr., Wyandotte, Mich., and Joseph B. Skaptason, Grandview, Mo., assignors to Wyandotte Chemicals Corporation, Wyandotte, Mich., a corporation of Michigan
No Drawing. Filed Jan. 8, 1962, Ser. No. 164,991
8 Claims. (Cl. 167—33)

This invention relates to a method for controlling insects in stored products. More particularly this invention relates to a method for controlling insects in stored products including various grains and their milled products, such as wheat, corn, rice, soybean and the like, and other products, such as tobacco and the like, by the employment of a space fumigant.

Every year millions of dollars' worth of stored products are destroyed during storage by insects. The damage is caused both by consumption of the products by the insects and by spoilage caused by the insects. For example, when grain insects heavily infest an acre of stored grain, the heat and moisture created by their metabolic processes results in hot and moist areas in the grain or as they are often called "hot spots." The hot spots cause the grain to rot, mold or sprout, thus resulting in serious damage to the grain. In addition to the actual destruction of the grain, grain containing insects, rot, mold or sprouts is given a low grade or may be declared unfit for human consumption. This also results in an economic loss.

Various methods have been employed to control insects in stored products; however, the use of fumigants has been the most successful. The success or failure of such a method is directly related to the fumigant material utilized. Numerous fumigation methods are known in the art; however, they all have certain disadvantages.

It is desirable in fumigation methods to utilize a fumigant compound that vaporizes at ambient temperatures, has a high flash point and is nontoxic or of low toxicity to humans. The method of controlling insects must result in stored products having a low residue of the fumigant material and the fumigant used in the method must be lethal to several types of stored product insects.

Therefore, it is an object of this invention to provide a new method for controlling insects in stored products.

The above and other objects are accomplished by the provision of a method for controlling stored product insects in products stored in an enclosed storage area which comprises subjecting the insects to an atmosphere containing a lethal concentration of N-(α-methylacetonitrile)-morpholine vapor.

The method of this invention is useful to control many of the common insects normally associated with stored products and may be accomplished in any closed storage space, for example grain elevators, box cars, warehouses, buildings and ships. Representative of the insects which are controlled are the rice weevil, granary weevil, lesser grain borer, cadelle beetle, saw-toothed grain beetle, confused flour beetle, flat grain beetle, red flour beetle, Indian-meal moth, angoumois grain moth, larger cabinet beetle, khapra beetle, cigarette beetle and black carpet beetle.

N-(α-methylacetonitrile)-morpholine, the fumigant material utilized in the present insect control method, is prepared by reacting lactonitrile with morpholine. The compound has a boiling point of 70° C. at 1.2 mm. pressure and a flash point of 235° F. The compound is of low toxicity to humans. An acute oral evaluation of the toxcity indicates an $LD_{50}$ (lethal does at which 50% of the population will die) of approximately 56 mg./kg. to rats and tests indicate an acute percutaneous $LD_{50}$ to rats is approximately 810 mg./kg. The compound was also found to be minimally irritating as the result of skin irritation tests performed on rabbits. Thus the utilization of N-(α-methylacetonitrile)-morpholine in the method for controlling insects of this invention results in a method which is minimally hazardous to the operators and creates little fire or explosion danger.

The fumigant material, N-(α-methylacetonitrile)-morpholine may be mixed with other fumigant materials if desired, for example carbon tetrachloride. However, diluents such as carbon dioxide, and the like, which are normally utilized to dilute fumigant materials to reduce the danger of explosion and fire, are not necessary in the method of this invention because of the high flash point of N-(α-methylacetonitrile)-morpholine. However, they may be utilized if desired to minimize the possibility of explosion or fire even more.

In carrying out the method of this invention for controlling stored product insects, the stored product insects are exposed to an atmosphere containing a lethal amount of N-(α-methylacetonitrile)-morpholine vapor. To be effective the concentration of N-(α-methylacetonitrile)-morpholine vapor should be at least about 0.1 pound per 1000 cubic feet of enclosed space. The practical limits for the concentration of N-(αmethylacetonitrile)-morpholine vapor are from about 0.1 to 5 pounds per 1000 cubic feet of enclosed space and a preferred concentration is about 0.5 to 1.5 pounds per 1000 cubic feet. For the best results the method of this invention should be carried out at a temperature of about 60 to 100° F.

Any convenient method may be employed to accomplish the introduction of the lethal quantity of N-(α-methylacetonitrile)-morpholine vapor into the stored products. One means is to fumigate the stored product periodically with air containing a lethal concentration of N-(α-methylacetonitrile)-morpholine vapor or the fumigant compound vapors mixed with air may be continuously circulated around or through the stored product. However, a more preferred method for stored grain consists of spraying the top layer of the stored grain with the fumigant material in liquid phase. Immediately the fumigant commences to vaporize and since its vapors have a density greater than air they permeate down through the grain and within a short time produce an atmosphere containing a lethal concentration of the N-(α-methylacetonitrile)-morpholine vapors throughout the storage space. Another method of accomplishing the same result as in the previous method described is to bury containers having either small openings on the bottom or a wick extending from the bottom containing liquid N-(α-methylacetonitrile)-morpholine at intervals about the surface and about six inches below the surface of the top of the grain. Fumigant from the bottles vaporizes and produces a lethal concentration of vapors throughout the storage space. Still another means of accomplishing a lethal concentration of fumigant within the storage area is to spray the grain or other stored product with liquid fumigant as it enters the storage space. The fumigant vaporizes and creates a lethal atmosphere shortly after the product is stored.

Thus it should be apparent from the foregoing that numerous methods of effectuating a lethal concentration of N-(α-methylacetonitrile)-morpholine vapors within the storage space may be utilized and are considered an embodiment of the present invention.

In general the insect-infested product should be exposed to the N-(α-methylacetonitrile)-morpholine vapors for at least about 24 hours and preferably about 24 to 96 hours or longer. However, it should be noted that the exposure time is directly affected by the temperature, concentration of the vapors, size of storage space, ease of vapor penetration of the stored product and whether the storage area is airtight.

In testing N-(α-methylacetonitrile)-morpholine as a fumigant its effects on four different stored product insects was studied. The insects taking part in the tests were adult confused flour beetle, *Tribolium confusum*, adult saw-toothed grain beetle, *Oryzaephilus surinamensis*, adult cigarette beetle, *Lasioderma serricorne*, and black carpet beetle larva, *Attagenus piceus*. In carrying out the tests, the insects were placed in cages which were suspended in 19.5-liter glass bottles. Ten insects were placed in each cage. The bottles were stored for 24 hours at 80° F. and 60–90% relative humidity to stabilize the atmosphere in the bottles. The fumigant (N-(α-methylacetonitrile)-morpholine) was measured out and deposited on blotting paper suspended in the bottles. After the fumigant was introduced, the bottles were stored at 80° F. and 60–95% relative humidity for a 24-hour fumigation period. Then the insects were transferred to clean chambers containing food and stored at 80° F. and 60% relative humidity. Mortality observations were conducted after the 24-hour fumigation period and at regular intervals thereafter. Insects that did not respond to touch, light, or heat were considered as dead. The following table presents the results of the tests.

TABLE I

*Insect Mortality—Time vs. Concentration*

| Fumigant dosage mg./l | Percent Mortality—Hours after fumigation | | | | | |
|---|---|---|---|---|---|---|
| | 24 | 168 | 336 | 504 | 672 | 840 |
| Adult cigarette beetle: | | | | | | |
| zero (check) | 2.2 | 11.2 | | | | |
| 0.069 | 0.0 | 25.0 | | | | |
| 0.137 | 1.1 | 44.9 | | | | |
| 0.206 | 69.4 | 68.8 | | | | |
| 0.275 | 96.7 | 96.7 | | | | |
| 0.344 | 100.0 | 100.0 | | | | |
| Adult saw-toothed grain beetle: | | | | | | |
| zero (check) | 0.0 | 0.0 | 1.1 | 1.1 | | |
| 0.137 | 46.1 | 49.4 | 51.7 | 55.1 | | |
| 0.206 | 100.0 | 100.0 | 100.0 | 100.0 | | |
| Black carpet beetle larva: | | | | | | |
| zero (check) | | 0.0 | 0.0 | 0.0 | 0.0 | 1.1 |
| 0.687 | | 0.0 | 0.0 | 1.1 | 1.1 | 1.1 |
| 1.718 | | 0.0 | 7.9 | 9.0 | 9.0 | 9.0 |
| 2.749 | | 13.3 | 33.3 | 38.9 | 42.2 | 42.2 |
| 3.779 | | 16.7 | 51.1 | 53.3 | 56.7 | 56.7 |
| 4.810 | | 18.7 | 52.7 | 53.8 | 54.9 | 54.9 |
| 5.841 | | 23.3 | 70.0 | 73.3 | 75.6 | 75.6 |
| 6.872 | | 50.0 | 77.8 | 80.0 | 80.0 | 80.0 |
| 8.933 | | 67.8 | 82.2 | 82.2 | 82.2 | 82.2 |
| 10.995 | | 75.6 | 81.1 | 82.2 | 82.2 | 82.2 |
| 13.056 | | 82.2 | 92.2 | 96.7 | 96.7 | 96.7 |
| Confused flour beetle: | | | | | | |
| zero (check) | 0.0 | 0.0 | 0.0 | 0.0 | | |
| 0.687 | 3.3 | 5.6 | 5.6 | 5.6 | | |
| 1.374 | 24.7 | 30.3 | 33.7 | 36.0 | | |
| 2.062 | 52.2 | 62.2 | 63.3 | 63.3 | | |
| 2.749 | 68.9 | 68.9 | 68.9 | 70.0 | | |
| 3.436 | 71.1 | 70.0 | 70.0 | 70.0 | | |
| 4.123 | 81.3 | 81.3 | 81.3 | 82.4 | | |
| 4.810 | 91.1 | 91.1 | 92.2 | 93.3 | | |

Another test was carried out with the confused flour beetle. In this test the insects were exposed for five hours to the fumigant in the concentrations listed in the table below and then removed. Mortality counts were taken after 48 hours and the results appear below.

TABLE II

Dosage of N-(α-methylacetonitrile)-morpholine mg./l.: Percent mortality

| | |
|---|---|
| 8 | 72 |
| 16 | 93 |
| 24 [1] | 100 |
| 32 | 100 |

[1] Equivalent to 1.5 lb./1000 cubic feet of enclosed storage space.

Thus it is readily apparent from the foregoing that a new method for controlling insects in stored products has been discovered. The method is highly effective against the common stored product insects and is considerably less hazardous to operators and presents less of an explosion or fire hazard than the methods presently employed in the art.

We claim:

1. A method for controlling insects in stored products which comprises subjecting the insects to an atmosphere comprising a lethal concentration of the vapor of N-(α-methylacetonitrile)-morpholine.

2. A method for controlling insects in stored products which comprises subjecting the insects to an atmosphere comprising at least about 0.1 pound per 1,000 cubic feet of enclosed space of the vapor of N-(α-methylacetonitrile)-morpholine.

3. A method for controlling insects in stored products which comprises subjecting the insects to an atmosphere comprising at least about 0.1 pound to 5 pounds per 1,000 cubic feet of enclosed space of the vapor of N-(α-methylacetonitrile)-morpholine.

4. A method for controlling insects in stored products which comprises fumigating said stored products with a fumigant composition comprising a lethal concentration of the vapor of N-(α-methylacetonitrile)-morpholine.

5. A method for controlling insects in stored products which comprises circulating an air stream containing a fumigant composition comprising a lethal concentration of the vapor of N-(α-methylacetonitrile)-morpholine through said stored products.

6. A method for controlling insects in stored grain which comprises spraying the top layer of grain stored in an enclosed space with a liquid fumigant composition comprising N-(α-methylacetonitrile)-morpholine and allowing the sprayed fumigant composition to vaporize within said stored grain, the concentration of N-(α-methylacetonitrile)-morpholine in said fumigant composition being such as to produce a lethal concentration of N-(α-methylacetonitrile)-morpholine vapors in said stored grain.

7. A method for controlling insects in stored grain which comprises placing containers of a fumigant composition comprising N-(α-methylacetonitrile)-morpholine in the liquid phase within the stored grain and allowing the fumigant composition to vaporize therefrom and produce a lethal concentration of fumigant vapor in the storage space.

8. A method for controlling insects in stored grain which comprises spraying the surface of grain as it goes into storage with a liquid fumigant composition comprising N-(α-methylacetonitrile)-morpholine and allowing the fumigant composition to vaporize and thereby produce a lethal concentration of fumigant vapor in the storage space.

References Cited in the file of this patent

UNITED STATES PATENTS 2,425,693    Cook et al.    Aug. 12, 1947

OTHER REFERENCES

J. Am. Chem. Soc., vol. 72, pp. 2804–6 (1950); vol. 79, pp. 6230–3 (1957).

UNITED STATES PATENT OFFICE
CERTIFICATE OF CORRECTION

Patent No. 3,104,200                               September 17, 1963

William K. Langdon et al.

It is hereby certified that error appears in the above numbered patent requiring correction and that the said Letters Patent should read as corrected below.

Column 1, line 22, for "acre" read -- area --; column 2, line 5, for "does" read -- dose --; line 33, for "N-(amethylacetonitrile)-" read -- N-(α-methylacetonitrile)- --; column 3, line 18, for "effects" read -- effect --.

Signed and sealed this 26th day of May 1964.

(SEAL)
Attest:

ERNEST W. SWIDER
Attesting Officer

EDWARD J. BRENNER
                                                                   Commissioner of Patents